United States Patent
Lin et al.

(10) Patent No.: US 10,927,842 B2
(45) Date of Patent: Feb. 23, 2021

(54) COOLING FAN MODULE

(71) Applicant: TAIWAN MICROLOOPS CORP., New Taipei (TW)

(72) Inventors: Chun-Hung Lin, New Taipei (TW); Yi-Shen Chien, New Taipei (TW)

(73) Assignee: TAIWAN MICROLOOPS CORP., New Taipei (TW)

( * ) Notice: Subject to any disclaimer, the term of this patent is extended or adjusted under 35 U.S.C. 154(b) by 387 days.

(21) Appl. No.: 16/045,458

(22) Filed: Jul. 25, 2018

(65) Prior Publication Data

US 2020/0032807 A1    Jan. 30, 2020

(51) Int. Cl.
| | | |
|---|---|---|
| *F04D 29/00* | (2006.01) | |
| *F21V 33/00* | (2006.01) | |
| *F21V 23/00* | (2015.01) | |
| *F04D 29/52* | (2006.01) | |
| *F04D 19/00* | (2006.01) | |
| *F21Y 115/10* | (2016.01) | |

(52) U.S. Cl.
CPC ......... *F04D 29/005* (2013.01); *F04D 19/002* (2013.01); *F04D 29/522* (2013.01); *F21V 23/003* (2013.01); *F21V 33/0096* (2013.01); *F21Y 2115/10* (2016.08)

(58) Field of Classification Search
CPC .... F04D 29/005; F04D 29/002; F21V 23/003; F21V 33/0096
See application file for complete search history.

(56) References Cited

U.S. PATENT DOCUMENTS

| | | | | |
|---|---|---|---|---|
| 9,429,286 | B2 * | 8/2016 | Luo | ............................ F21V 1/00 |
| 2006/0133920 | A1 * | 6/2006 | Chen | ................... F04D 25/0613 |
| | | | | 415/76 |
| 2007/0237636 | A1 * | 10/2007 | Hsu | ....................... F04D 29/005 |
| | | | | 416/5 |

* cited by examiner

*Primary Examiner* — Justin D Seabe
*Assistant Examiner* — Michael L Sehn
(74) *Attorney, Agent, or Firm* — Chun-Ming Shih; HDLS IPR Services

(57) ABSTRACT

A cooling fan module includes a fan frame, a light emitting part installed in the fan frame, an LED controller installed in the fan frame and electrically connected to the light emitting part, a fan body, and an external connector. The fan body includes a supporting stand detachably connected to the fan frame, a blade set installed on the supporting stand and can rotate with respect to the supporting stand, and a fan connector fixed to the supporting stand and electrically connected to the blade set. The external connector is fixed to the fan frame. The external connector can be electrically plugged in the fan connector to send a first signal; the external connector is electrically connected to the LED controller to send a second signal. Therefore, the cooling fan module has the advantages of easy assembly and reduced incorrect connection.

6 Claims, 4 Drawing Sheets

COOLING FAN MODULE

BACKGROUND OF THE INVENTION

Field of the Invention

The present invention relates to a heat dissipation device, and in particular to a cooling fan module.

Description of Related Art

While the current computer becomes increasingly powerful, the heat generated by the computer host increases gradually. Thus, a cooling fan is required to be installed inside the computer to generate forced air flow to bring the heat out of the computer case. Also, the modern design tends to be novel so the cooling fan is equipped with the RGB LEDs showing red color, green color, and blue color such that the brilliant light effects can be produced during the operation of the cooling fan.

However, to operate the cooling fan requires a power supply module and to provide the changing light effects for the red, blue and green light emitting diodes (RGB LEDs) also requires a signal module. Thus, the cooling fan has to be equipped with two connectors for external connection, which causes the complicated assembly steps of the cooling fan and the incorrect connection thereof. Accordingly, how to integrate the power supply module and the signal module of RGB LEDs into the cooling fan is a key point of the research and development in the field of the cooling fans.

In view of foregoing, the inventor pays special attention to research with the application of related theory to propose the cooling fan of the present invention, a reasonable design, to overcome the above disadvantages regarding the above related art.

SUMMARY OF THE INVENTION

The present invention provides a cooling fan module which uses an external connector electrically plugged in the fan connector to send a first signal and uses the external connector electrically plugged in the LED controller to send a second signal such that the required power for the fan body and the required signals for operation of the light emitting part are distributed together through a common external connector. In this way, the cooling fan module has only one external connector for external connection to achieve the advantages of easy assembly and reduced incorrect connection.

In an embodiment, the present invention provides a cooling fan module comprising a fan frame, at least one light emitting part, an LED controller, a fan body, and an external connector. The at least one light emitting part is installed in the fan frame. The LED controller is installed in the fan frame and electrically connected to the at least one light emitting part. The fan body comprises a supporting stand detachably connected to the fan frame, a blade set installed on the supporting stand and able to rotate with respect to the supporting stand, and a fan connector fixed to the supporting stand and electrically connected to the blade set. The external connector is fixed to the fan frame; the external connector is electrically plugged in the fan connector to send a first signal; the external connector is electrically connected to the LED controller to send a second signal.

Based on the previous description, the fan frame provided with plural slits, a latching slot disposed on the bottom wall of each of the slits, the fan body having a supporting stand extending to form plural flexible arms, each of the flexible arms protruding a latch, the flexible arms being individually snap-fit to the corresponding slits, and the latches being individually snap-fit to the corresponding latching slots achieve the effects of easy assembly and disassembly of the cooling fan module.

DETAILED DESCRIPTION OF THE INVENTION

Figure 1:
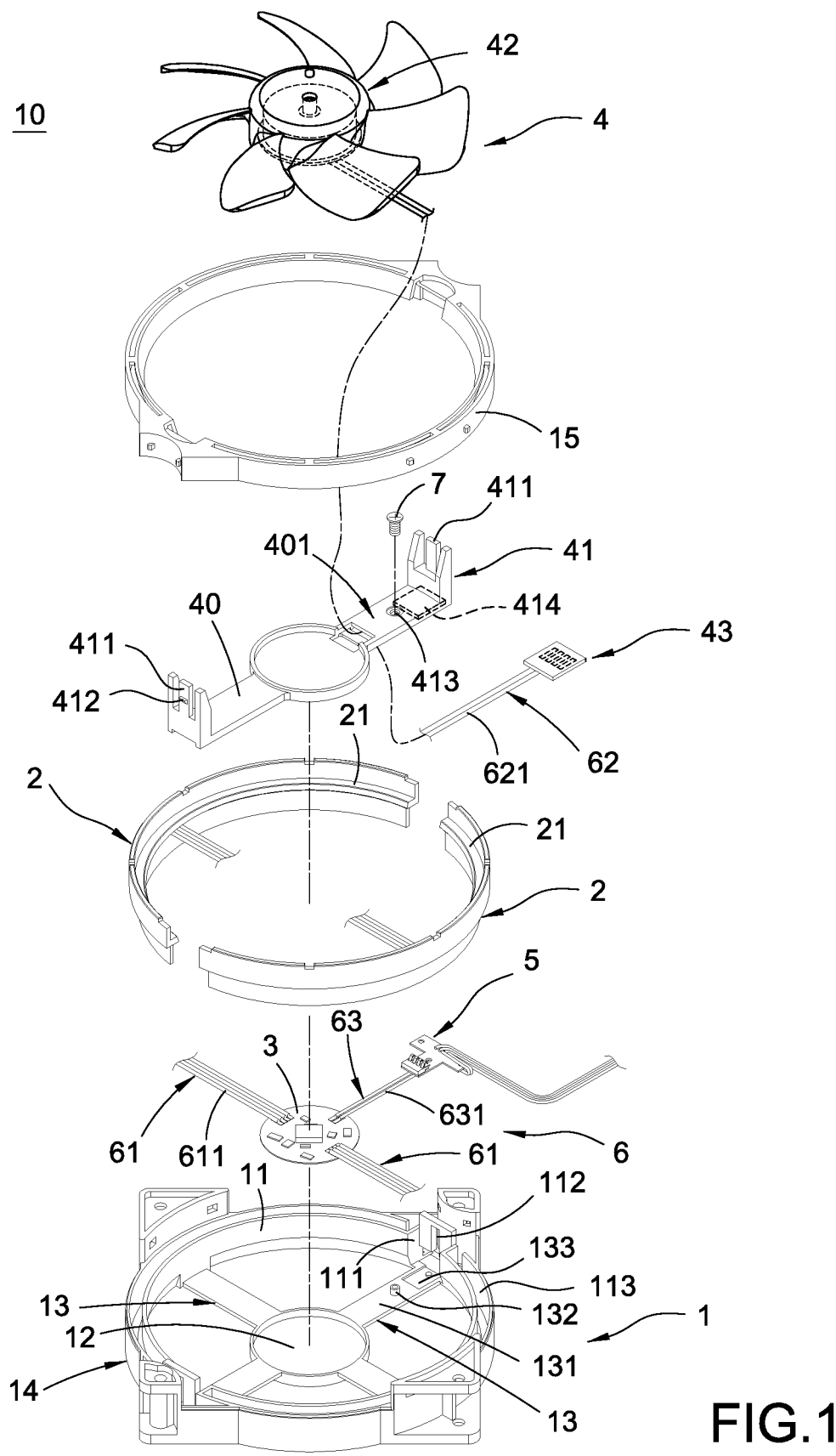
FIG. 1 is an exploded perspective view of the cooling fan module of the present invention.
Figure 2:
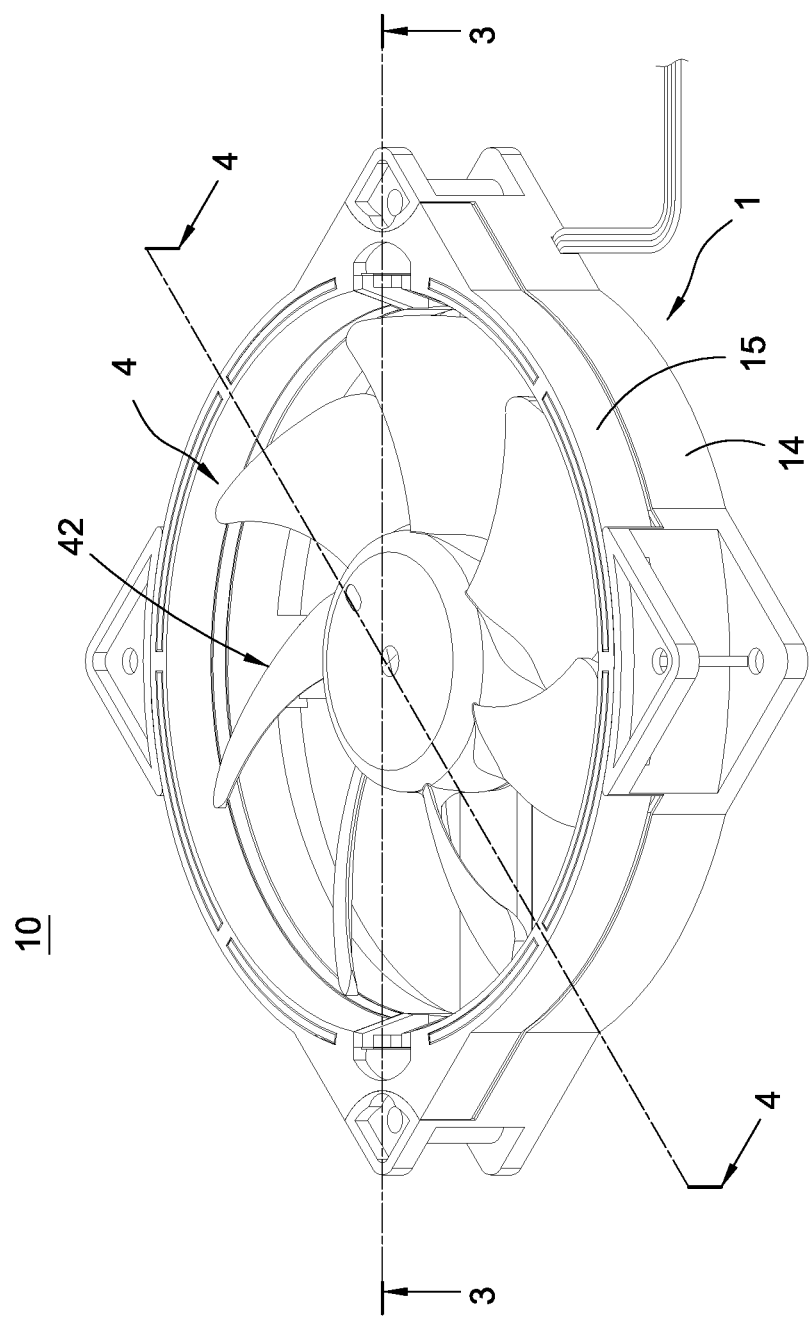
FIG. 2 is a perspective assembled view of the cooling fan module of the present invention.

The detailed description and technical details of the present invention will be explained below with reference to accompanying figures. However, the accompanying figures are only for reference and explanation, but not to limit the scope of the present invention.

Please refer to FIGS. 1-4. The present invention provides a cooling fan module. The cooling fan module 10 mainly comprises a fan frame 1, at least one light emitting part 2, an LED controller 3, a fan body 4, and an external connector 5.

As shown in FIGS. 1-4, the fan frame 1 has a ring wall 11. A plurality of slits 111 are disposed on the inner wall of the ring wall 11. A latching slot 112 is disposed on the bottom wall of each of the slits 111. In the current embodiment, the number of the slits 111 is two; the ring wall 11 is provided with two receiving slots 113 at two sides of the two slits 111.

Besides, the fan frame 1 further has a middle plate 12 and a plurality of supporting beams 13 which are integrally formed to connect the middle plate 12 and the ring wall 11. One of the supporting beams 13 is a fixing beam 131 having a first locking hole 132; a recessed slot 133 is disposed at the top of the fixing beam 131.

Also, the fan frame 1 further has a lower frame 14 and a ring cover 15 which are combined together. The ring wall 11, the middle plate 12, and the supporting beams 13 are formed in the lower frame 14. The two receiving slots 113 are recessed from the top of the ring wall 11. The ring cover 15 is assembled on the top of the ring wall 11 and covers the two receiving slots 113 correspondingly.

Figure 4:
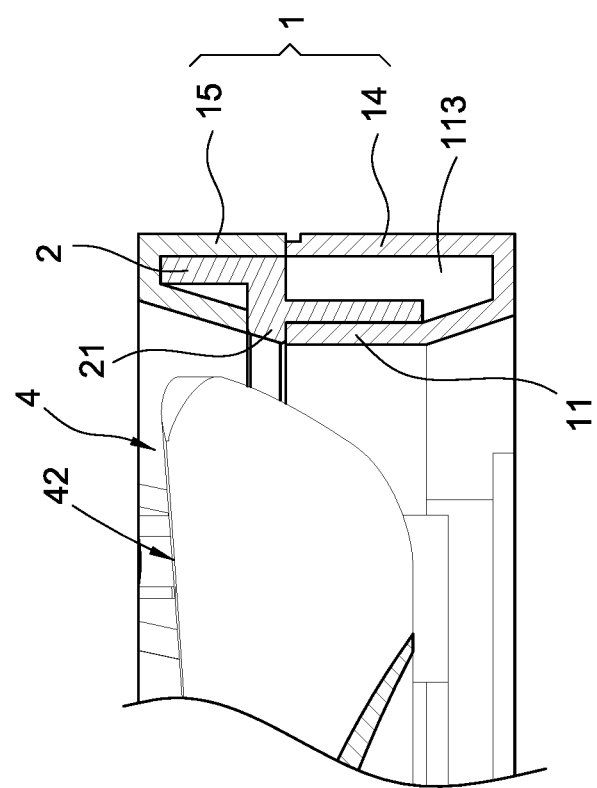
FIG. 4 is another local cross-sectional view of the cooling fan module along line 4-4 of FIG. 2.

As shown in FIGS. 1 and 4, the light emitting parts 2 are installed in the fan frame 1. The details are given blow. In the current embodiment, the number of the light emitting parts 2 is two. Each of the light emitting parts 2 is received in the corresponding receiving slots 113 and has a C-shaped light guide block 21 which is clamped between the lower frame 14 and the ring cover 15 and is exposed to the inner wall of the ring wall 11 to produce the annular light effects.

In addition, in the current embodiment, the light emitting part 2 comprises an LED and a light guide block. The LED is an RGB LED which can give red (R), green (G), and blue (B) colors, but not limited to this.

As shown in FIGS. 1-4, the fan body 4 comprises a supporting stand 41, a blade set 42, and a fan connector 43. The supporting stand 41 extends to form a plurality of flexible arms 411; each of the flexible arms 41 protrudes a latch 412. The flexible arms 411 are individually snap-fit to the corresponding slits 111 and the latches 412 are individually snap-fit to the corresponding latching slots 112. In this way, the supporting stand 41 can be detachably connected to the fan frame 1.

In the current embodiment, the number of the flexible arms 411 is two. The supporting stand 41 is a transverse beam 40 having a top surface 401, a bottom surface 402, and a second locking hole 413. The flexible arms 411 extend upward from two ends of the transverse beam 40 and the top surface 401. A recess 414 is disposed on the bottom surface 402 of the transverse beam 40; the fan connector 43 is embedded in the recess 414.

Further, the blade set 42 is installed on the top surface 401 of the supporting stand 41 and can rotate with respect to the supporting stand 41. Also, the fan connector 43 is fixed to the supporting stand 41 and electrically connected to the blade set 42. The fan connector 43 is used to provide electric power for the blade set 42 to rotate.

Figure 3:
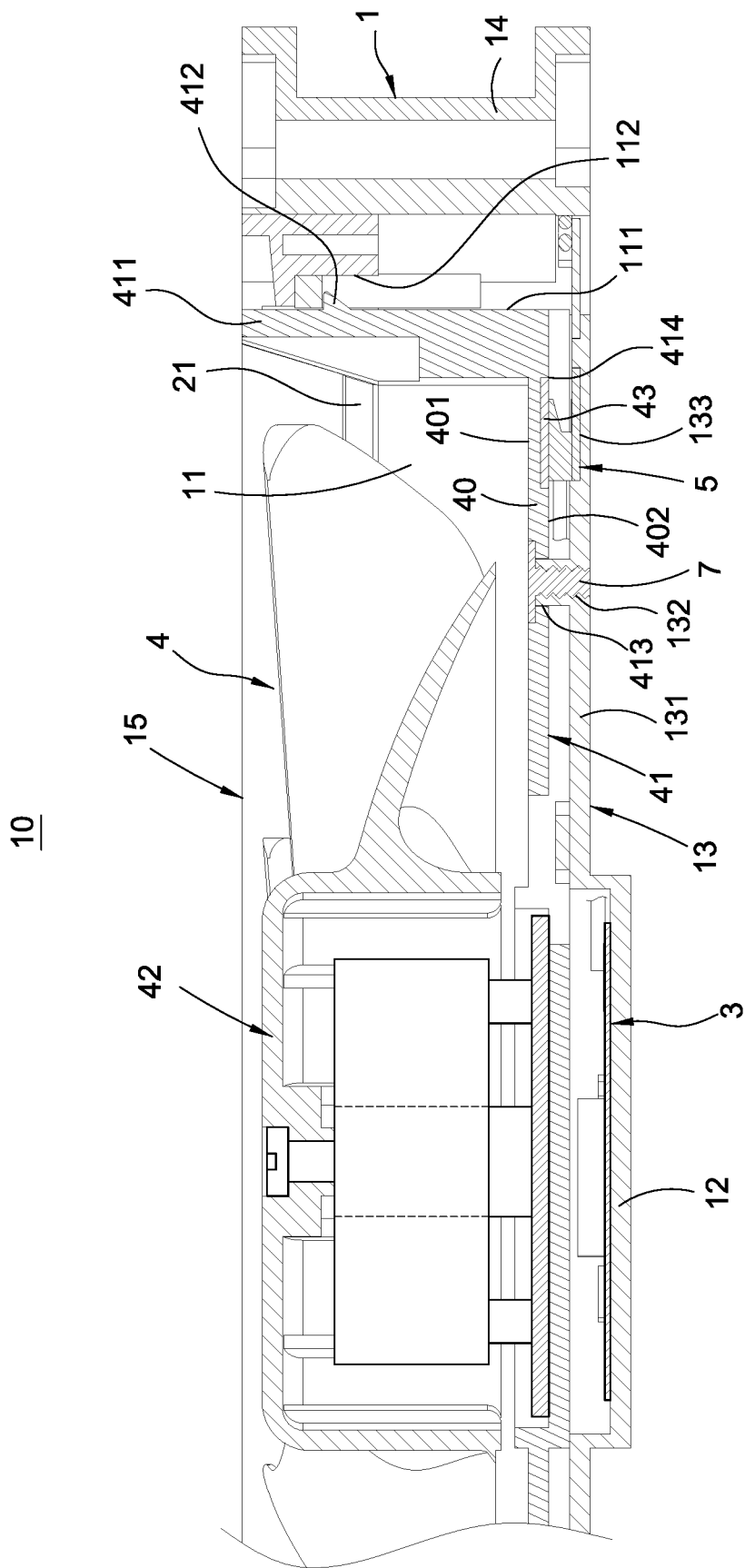
FIG. 3 is a local cross-sectional view of the cooling fan module along line 3-3 of FIG. 2.

As shown in FIGS. 1 and 3, the external connector 5 is embedded in the recessed slot 133 of the fixing beam 131 such that the external connector 5 is fixed to the fan frame 1. The external connector 5 can be electrically plugged in the fan connector 43 to send a first signal and further provide power for the blade set 42 to operate; the external connector 5 is electrically connected to the LED controller 3 to send a second signal and further provides power for the LEDs of the light emitting parts 2 to operate and controls the brightness, colors, and lighting duration of the LEDs of the light emitting parts 2.

The cooling fan module 10 of the present invention further comprises a cable assembly 6 having at least one first wire assembly 61, a second wire assembly 62, and a third wire assembly 63. The first wire assembly 61 has at least four first wires 611 electrically connected to the light emitting parts 2 and the LED controller 3. The second wire assembly 62 has at least two second wires 621 electrically connected to the blade set 42 and the fan connector 43. The third wire assembly 63 has at least two third wires 631 electrically connected to the LED controller 3 and the external connector 5. In the current embodiment, the number of the at least one first wire assembly is two. The four first wires 611 are individually electrically connected to the corresponding light emitting parts 2 and the LED controller 3.

The cooling fan module 10 of the present invention further comprises a fastener 7 which penetrates through and is fixed in the first locking hole 132 and the second locking hole 413. The fan connector 43 and the external connector 5 are clamped together between the fixing beam 131 and the transverse beam 40.

As shown in FIGS. 1 and 3, the assembly of the cooling fan module 10 of the present invention is done by using the external connector 5 which can be electrically plugged in the fan connector 43 to send a first signal and the external connector 5 which is electrically connected to the LED controller 3 to send a second signal such that the required power for the fan body and the required signals for operation of the light emitting part are distributed together through the common external connector. Therefore, compared with the traditional cooling fan which requires two connectors for external connection, the cooling fan module 10 is equipped with only one external connector 5 for external connection, which gains the advantages of easy assembly and reduced incorrect connection.

Moreover, the fan frame 1 is provided with a plurality of slits 111; a latching slot 112 is disposed on the bottom wall of each of the slits 111. The fan body 4 comprises the supporting stand 41 which extends to form a plurality of flexible arms 411; each of the flexible arms 411 protrudes a latch 412. When the flexible arms 411 are pressed to cause the flexible arms 411 to be snap-fit to the corresponding slits 111, the latches 412 are individually snap-fit to the corresponding latching slots 112. Thus, the supporting stand 41 can be assembled in the fan frame 1 quickly. When the flexible arms 411 are pressed in an opposite direction to detach the latches 412 from the latching slots 112, the flexible arms 411 are detached from the slits 111. Thus, the supporting stand 41 can be disassembled from the fan frame 1 quickly. In this way, the effects of easy assembly and disassembly of the cooling fan module 10 can be achieved.

In addition, the external connector 5 is embedded in the recessed slot 133 of the fixing beam 131. The fan connector 43 is embedded in the recess 414 of the transverse beam 40. Besides, the fastener 7 penetrates through and is fixed in the first locking hole 132 and the second locking hole 413 such that the fan connector 43 and the external connector 5 are clamped together between the fixing beam 131 and the transverse beam 40. In this way, the fan connector 43 and the external connector 5 are firmly positioned on the cooling fan module 10 and the structural strength of the cooling fan module 10 is then further enhanced.

In summary, the cooling fan module of the present invention can certainly reach the expected objective and avoid the disadvantages of the prior art. Also, the present invention is useful, novel and non-obvious to be patentable. Please examine the application carefully and grant it as a formal patent for protecting the rights of the inventor.

What is claimed is:

1. A cooling fan module, comprising:
a fan frame;
at least one light emitting part installed in the fan frame;
an LED controller installed in the fan frame and electrically connected to the at least one light emitting part;
a fan body comprising:
a supporting stand detachably connected to the fan frame;
a blade set installed on the supporting stand and able to rotate with respect to the supporting stand;
a fan connector fixed to the supporting stand and electrically connected to the blade set;
an external connector fixed to the fan frame, wherein the external connector is electrically plugged in the fan connector to send a first signal, wherein the external connector is electrically connected to the LED controller to send a second signal,
wherein the fan frame has a ring wall, wherein a plurality of slits are disposed on the inner wall of the ring wall, wherein a latching slot is disposed on the bottom wall of each of the slits, wherein the supporting stand extends to form a plurality of flexible arms, wherein each of the flexible arms protrudes a latch, wherein the flexible arms are individually snap-fit to the corresponding slits and the latches are individually snap-fit to the corresponding latching slots,
wherein the numbers of the slits and the flexible arms are both two, wherein the supporting stand is a transverse beam having a top surface and a bottom surface, wherein the flexible arms extend upward from two ends of the transverse beam and the top surface, wherein the blade set is installed on the top surface,
wherein the fan frame has a middle plate and a plurality of supporting beams which are integrally formed to connect the middle plate and the ring wall, wherein the LED controller is fixed to the middle plate, and
a fastener, wherein one of the supporting beams is a fixing beam having a first locking hole, wherein the transverse beam is provided with a second locking hole, wherein the fastener penetrates through and is fixed in the first locking hole and the second locking hole, wherein the fan connector and the external connector are both clamped between the fixing beam and the transverse beam.

2. The cooling fan module according to claim 1, wherein a recess is disposed on the bottom surface of the transverse beam, wherein the fan connector is embedded in the recess.

3. The cooling fan module according to claim 1, wherein a recessed slot is disposed at the top of the fixing beam, wherein the external connector is embedded in the recessed slot.

4. The cooling fan module according to claim 1, further comprising a cable assembly having at least one first wire assembly, a second wire assembly, and a third wire assembly, wherein the first wire assembly has at least four first wires electrically connected to the light emitting part and the LED controller, wherein the second wire assembly has at least two second wires electrically connected to the blade set and the fan connector, wherein the third wire assembly has at least two third wires electrically connected to the LED controller and the external connector.

5. The cooling fan module according to claim 4, wherein the numbers of the at least one light emitting part and the at least one first wire assembly are both two, wherein the ring wall is provided with two receiving slots at two sides of the slits, wherein the light emitting parts are individually received in the corresponding receiving slots, wherein the four first wires are individually electrically connected to the corresponding light emitting parts and the LED controller.

6. A cooling fan module, comprising:
a fan frame;
at least one light emitting part installed in the fan frame;
an LED controller installed in the fan frame and electrically connected to the at least one light emitting part;
a fan body comprising:
a supporting stand detachably connected to the fan frame;
a blade set installed on the supporting stand and able to rotate with respect to the supporting stand;
a fan connector fixed to the supporting stand and electrically connected to the blade set:
an external connector fixed to the fan frame, wherein the external connector is electrically plugged in the fan connector to send a first signal, wherein the external connector is electrically connected to the LED controller to send a second signal,
wherein the fan frame has a ring wall, wherein a plurality of slits are disposed on the inner wall of the ring wall, wherein a latching slot is disposed on the bottom wall of each of the slits, wherein the supporting stand extends to form a plurality of flexible arms, wherein each of the flexible arms protrudes a latch, wherein the flexible arms are individually snap-fit to the corresponding slits and the latches are individually snap-fit to the corresponding latching slots,
wherein the numbers of the slits and the flexible arms are both two, wherein the supporting stand is a transverse beam having a top surface and a bottom surface, wherein the flexible arms extend upward from two ends of the transverse beam and the top surface, wherein the blade set is installed on the top surface,
wherein the fan frame has a middle plate and a plurality of supporting beams which are integrally formed to connect the middle plate and the ring wall, wherein the LED controller is fixed to the middle plate, and
a cable assembly having at least one first wire assembly, a second wire assembly, and a third wire assembly, wherein the first wire assembly has at least four first wires electrically connected to the light emitting part and the LED controller, wherein the second wire assembly has at least two second wires electrically connected to the blade set and the fan connector, wherein the third wire assembly has at least two third wires electrically connected to the LED controller and the external connector,
wherein the numbers of the at least one light emitting part and the at least one first wire assembly are both two, wherein the ring wall is provided with two receiving slots at two sides of the slits, wherein the light emitting parts are individually received in the corresponding receiving slots, wherein the four first wires are individually electrically connected to the corresponding light emitting parts and the LED controller,
wherein the fan frame has a lower frame and a ring cover which are combined together, wherein the ring wall, the middle plate, and the supporting beams are formed in the lower frame, wherein the two receiving slots are recessed from the top of the ring wall, wherein the ring cover is assembled on the top of the ring wall and covers the two receiving slots correspondingly, wherein each of the light emitting parts has a C-shaped light guide block which is clamped between the lower frame and the ring cover and is exposed to the inner wall of the ring wall.

* * * * *